3,574,649
PROCESS FOR PRODUCING CONTINUOUS
BORON FILAMENTS
Roy Fanti, Springfield, Mass., and Urban E. Kuntz, East Hartford, Conn., assignors to United Aircraft Corporation, East Hartford, Conn.
Filed Feb. 24, 1967, Ser. No. 618,509
Int. Cl. C23c 11/00
U.S. Cl. 117—106          8 Claims

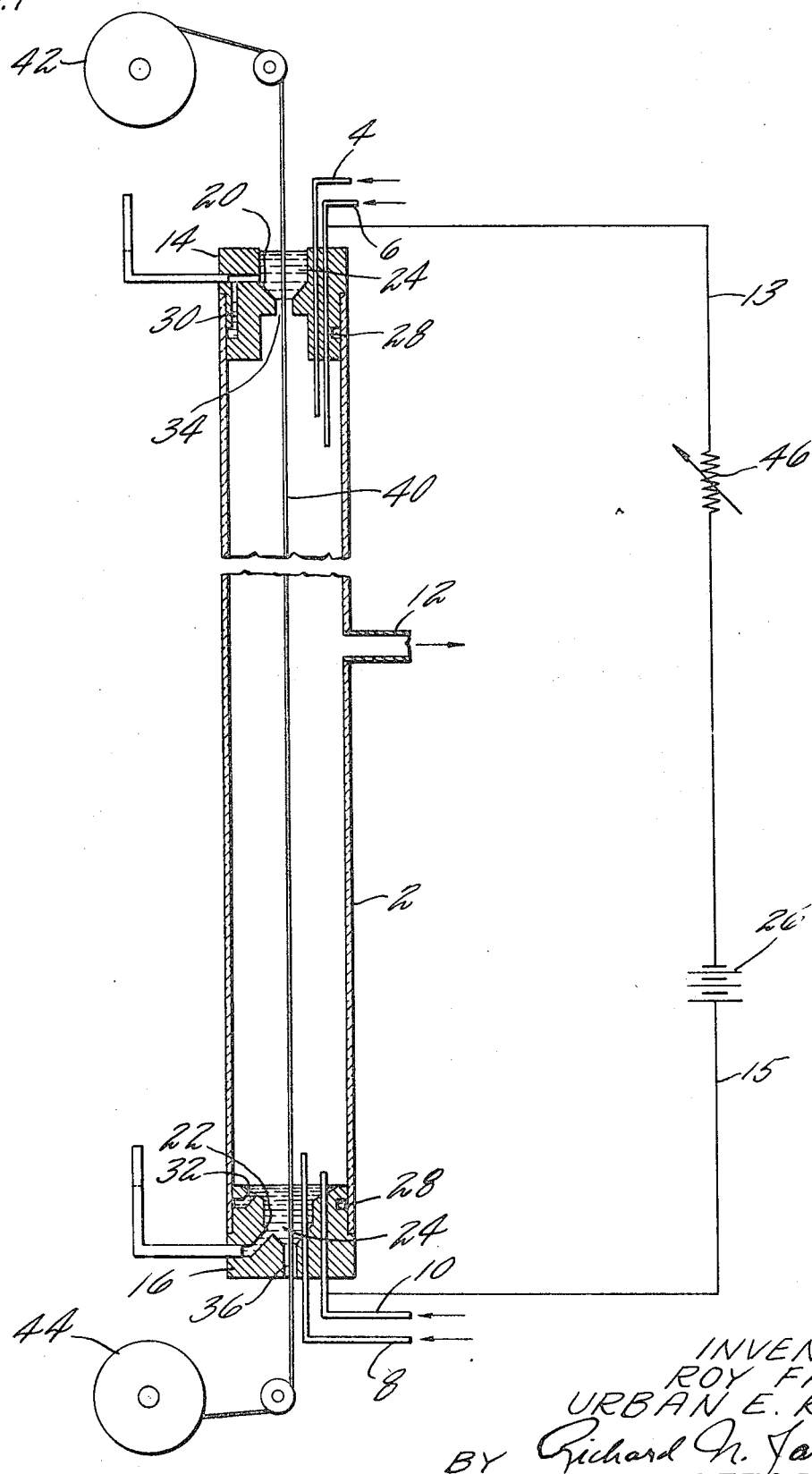

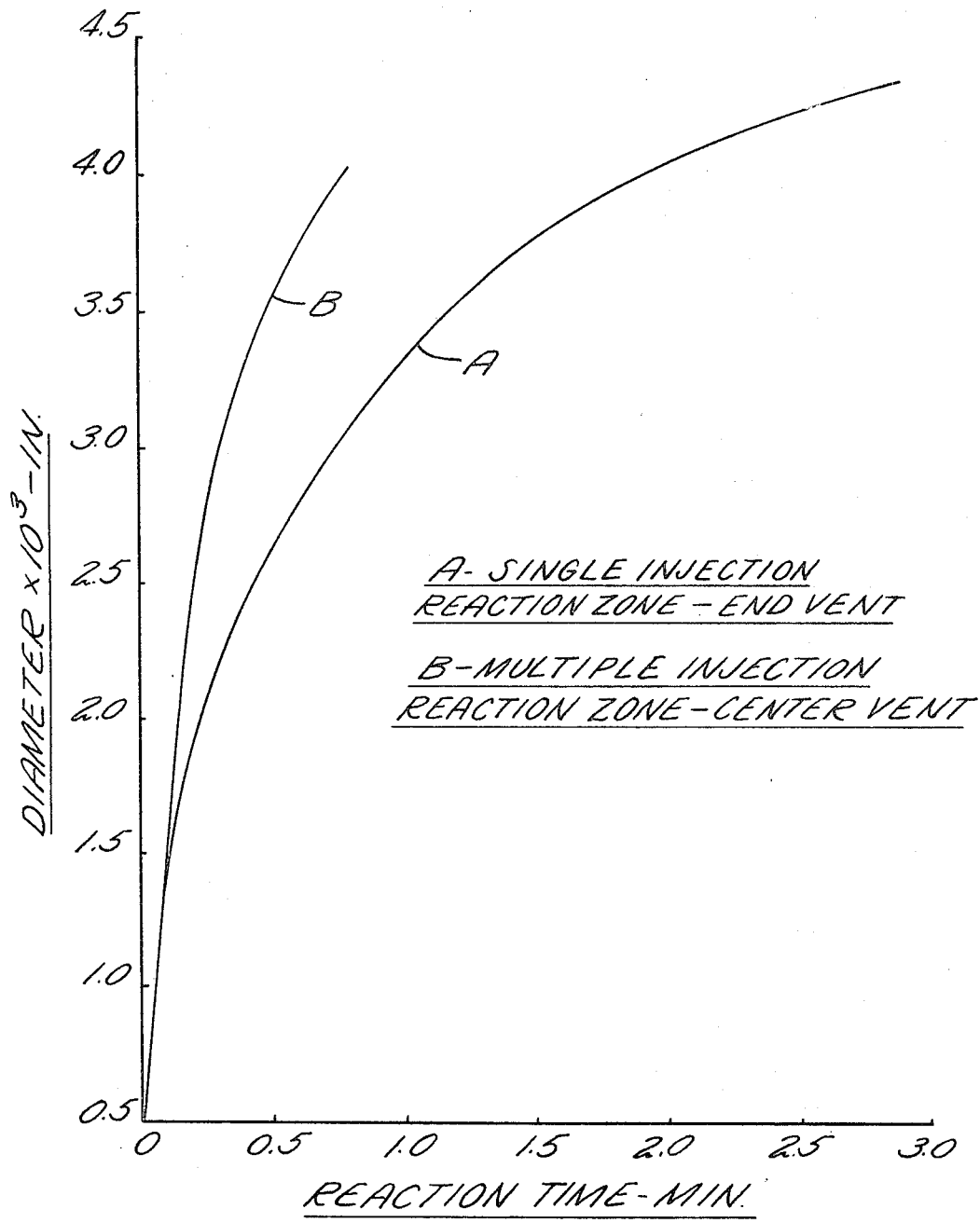

ABSTRACT OF THE DISCLOSURE

A chemical deposition process for producing continuous filamentary materials, such as boron, by reducing a decomposable gas such as boron trichloride, on a resistively heated wire, the wire being drawn through a reactor incorporating reactant gas introduction at both ends thereof and a central exhaust to thereby provide both concurrent and countercurrent flow conditions within the reactor and differing gas compositions at the ends.

BACKGROUND OF THE INVENTION

It is known that filamentary boron may be produced by pyrolytic techniques in a process wherein the boron is chemically deposited on a resistively heated tungsten wire which is drawn through a gaseous reactant stream consisting of boron trichloride admixed with hydrogen.

Early investigation quickly revealed the potential utility of these fibers in the production of new and improved structural materials designed to meet the stringent and imposing requirements of space age hardware. One of the most promising concepts to evolve from these investigations is that of fiber-reinforced composites which offer the potential of significant improvements in the composite modulus utilizing continuous filaments of boron which are characterized by high strength, a high modulus of elasticity and low density, as well as very favorable temperature characteristics. Although the potential of filamentary boron is thus recognized, realization of this potential in practical hardware has not yet occurred to any great extent primarily since the availability of this material is quite limited, being currently produced in laboratory-size lots in processes characterized by a very slow production rate. Nor will its potential ever be fully realized unless the processes can be so developed and refined as to improve the rate and cost of production of such filaments in processes yielding a product having consistently reproducible properties.

SUMMARY OF THE INVENTION

The present invention relates to the production of filamentary materials, particularly boron, by pyrolytic techniques in an improved process and apparatus whereby the production rate has been tripled with no deterioration of the desirable filament properties. It contemplates means for exercising close temperature control over a resistively heated wire which is prone to overheating due to changes in wire composition or character.

In accordance with one aspect of this invention a heated metallic wire formed of a suitable material, including such metals as tungsten, tantalum and molybdenum, is drawn through a gaseous reactant stream consisting, in the case of boron, of a decomposable boron halide, such as boron trichloride, usually admixed with hydrogen. The wire is heated resistively and is exposed to both concurrent and countercurrent reactant gas flow in its passage through the reactor.

It was observed in processes wherein boron is chemically deposited on a resistively heated wire that the temperature profile of the wire along its length is not uniform within the reactor, but goes through a maximum, the location of which appears to be a function of the reactant gas composition, the wire drawing rate, the electrical power supplied to the wire, the wire characteristics, and the direction of gas flow. The described temperature distribution is caused by resistance changes resultant from the coating achieved on the wire and variations in the reaction rate. Additionally, changes in the diameter of the wire as coating occurs affect the rate of heat loss by radiation, convection and conduction.

It has been observed that the fastest growth rates take place at the hotter region of the wire although temperature is not the only factor affecting the growth rate. Merely increasing the wire temperature is not the key to the production rate problem, however, since above certain wire temperatures spurious growths are effected which drastically reduce the ultimate tensile strength of the filament. When the voltage across the wire, in a boron trichloride-hydrogen system, was adjusted to produce a temperature maximum approximating 1300° C., and all other variables were held constant, a change from concurrent to countercurrent gas flow with respect to the drawing direction produced a pronounced change in the wire temperature profile, shifting the location of the peak temperature away from the wire inlet end of the reactor. Unfortunately, this procedure drastically retarded the fiber growth rate. It appears that the coating reaction is hindered in the countercurrent flow situation so that a greater length of wire travel must occur before a sufficient deposition and reaction between the coating and substrate occurs to effect the observed temperature rise. It was thus made clear that a mere gas flow reversal was not the answer.

In the present process, the reactant gases are introduced at both the wire inlet and outlet ends of the reactor and discharged from the central portion of the reactor to provide both concurrent and countercurrent flow in the same reactor. With this arrangement it is also possible and advisable to provide a different gas composition at the opposite ends of the reactor. Through the use of the above-described techniques a more uniform wire temperature has been achieved, and the production rate of filamentary boron has been unexpectedly tripled in a resulting product of exceptional uniformity and consistency. In a 36-inch long reactor, 3.2-mil boron fiber has been consistently produced at 345 feet/hour, the fibers exhibiting an average ultimate tensile strength of 460,000 p.s.i.

BRIEF DESCRIPTION OF THE DRAWINGS

In the detailed description which follows it will be convenient to make reference to the drawing in which:

FIG. 1 is a cross-sectional view, in elevation of a reactor arrangement usable in the practice of the present invention.

FIG. 2 is a graph illustrating the various boron deposition rates achievable in various reactor configurations.

DESCRIPTION OF THE PREFERRED EMBODIMENTS

Referring first to FIG. 1, the preferred reactor may be seen to comprise a tubular containment vessel 2, having dual gas inlets 4, 6 and 8, 10, at each end of the reactor with a common exhaust port 12 provided at the center thereof. The inlets 4 and 8 are utilized as the hydrogen feed and the inlets 6 and 10 comprise the boron halide reactant inlets to the reactor. The containment vessel is formed of quartz or Pyrex, although a wide variety of other dielectrics and glasses are suitable. The gas inlets penetrate and are electrically connected to the metallic end plugs 14 and 16 which provide the end closures for the containment vessel and, also, provide a convenient means through which the power may be supplied to the wire for resistance heating purposes.

Although the end plugs may be readily seen to differ in configuration, they both incorporate a number of common features. They are each formed to provide a well 20 and 22, respectively, for containing a suitable conductive sealant 4, such as mercury which serves the dual purpose of providing a gas seal around the wire where it penetrates the end plugs and further providing electrical contact between the wire and the respective end plugs, through the gas tubes 10 and 6, the leads 13 and 15, and the DC power source 26. The end plugs are further provided with an annular surface groove 28, which communicates with the mercury well 24 in the plugs through passageways 30 and 32, to provide sealing between the plug and the abutting wall of the containment vessel whereby gas is prevented from escaping from the reactor around the periphery of the plugs.

The respective plugs are further each formed with a centrally oriented orifice, 34 and 36, which is large enough to permit free passage of the wire therethrough but which, in combination with the wire, are small enough to retain the mercury, through surface tension forces, in the respective wells. Although it has not been shown, in frequent instances, the end plugs have been modified to accommodate an orificed ruby insert through which the wire passes and which provides the sealant retainment function previously mentioned. The jewels, of course, provide increased life to the orifice and less substrate contamination in the process. In more recent constructions, the orifice-forming member or members have been formed of tungsten to provide further reduced contamination and apparatus cost reduction.

The wire 40 (usually ½–3 mils diameter) is drawn through the reactor from feed reel 42 to take up reel 44 which maintain the wire under a slight tension and center it in the various orifice openings. Power from DC source 26 to the wire may be conveniently controlled by resistor 46 although other means are suitable.

As mentioned previously, the respective effective gas compositions admitted at the opposite ends of the reactor are preferably different in the optimum process and, hence, the wire passing through the reactor is exposed to different reactant gases in terms of boron halide concentration. The rate of reaction and, hence, deposition is generally a function of the concentration of the boron halide in the gas mixture. Various mol percentages of from 10–55 percent boron trichloride were employed, the optimum percentage for the boron halide occurring apparently at about 30 mol percent.

According to the present invention, the respective boron halide concentrations in the upper and lower sections of the reactor are preferably adjusted to provide a peak temperature in both sections of the reactor, the peak temperatures being selected to be below that at which the previously-mentioned spurious growths form. In the system mentioned, a peak temperature of approximately 1300° C. in both halves of the reactor has been found satisfactory.

It has been found that, in order to achieve the uniform temperature peaking in both ends of the reactor, the boron halide in the lower section will exceed that admitted to the upper segment. Satisfactory filaments will be obtained with a volume ratio of boron trichloride to hydrogen in the upper end ranging from 0.25 to 0.5 and in the lower end ranging from 0.5 to 3.0. The most preferred boron trichloride-hydrogen ratio at the upper end of the reactor on a volume percentage is about 1/2.5, while that admitted at the lower end has been found to be about 1/1.6.

It is evident that this process has utility in a wide variety of processes wherein the wire experiences a change in properties as a result of chemical or metallurgical change. Even in processes wherein no chemical reaction is involved, as for example where the basic composition of the wire or its metallurgical structure is altered, temperature control through dual injection and gas phase adjustment, as described, will be found advantageous.

Tests were conducted at various pressure levels between 1 and 50 atmospheres to determine the effect of reactant gas pressure on growth rate. It appears that increases in pressure increase both the initial and subsequent growth rates. However, in unheated reactors and under the limitations of room temperature operation, the partial pressure of boron trichloride available is only slightly over one atmosphere. In any event, regardless of the pressures involved, adherence to the principles set forth herein will provide substantial improvements in the filament production rate.

In FIG. 2, the relative deposition rates for the single concurrent flow reactor (A) and the multiple injection reactor of the present invention (B) are compared.

Example

A reactor was constructed of a quartz tube 32 inches long and having a diameter of 0.85 inch. The total gas composition at each end of the reactor was controlled to provide a peak temperature in each half of about 1300° C., the gases admitted at the upper end of the reactor comprising boron trichloride and hydrogen containing 17–24 mol percent boron trichloride at a flow rate of 600–1200 cc./min., the feed gas at the lower end comprising boron trichloride and hydrogen containing 30–36 mol percent boron trichloride at a total flow rate of 600–700 cc./min. Tungsten wire having a diameter of 0.0005 of an inch was drawn through the reactor at a rate of approximately 345 feet/min. to produce a resulting filament having a diameter of .0032 of an inch. The reactant gas pressure was approximately atmospheric. Later tests in a reactor 48 inches long utilized an upper feed comprising 1050 cc./min. boron trichloride and 2450 cc./min. hydrogen and a lower feed comprising 1050 cc./min. boron trichloride and 1600 cc./min. hydrogen.

A variety of different substrate materials were utilized in addition to tungsten, including tantalum, aluminum, molybdenum, aluminum-coated tungsten, tungsten-coated silicon and glass-coated copper. Boron deposition on both tantalum and molybdenum proved quite successful, the deposition rate on tantalum being equal to that on tungsten within the usual experimental error, that on molybdenum being slightly less than that on tungsten. Tests with tungsten substrates of 0.5–20 mils diameter were conducted.

Reactor lengths were varied between 16 and 48 inches and wire drawing rates were varied extensively.

Since the rate and quality of the fiber is dependent to a significant degree upon temperature, automatic temperature control equipment was employed to maintain the preset peak temperature within ±25° C. in the stabilized condition. The temperature indication and control was based on two-color (ratio) pyrometry.

Filamentary characterization studies were undertaken to determine the ultimate tensile strength consistency, diameter consistency, and cyclic fatigue behavior of the fibers thus produced. Ultimate tensile strength measurements were made on filament from an arbitrary spool of high strength 3-mil fiber and showed that over a distance of 1000 feet at intervals of approximately 50 feet, the ultimate tensile strength varied at extremes between 438,000 and 558,000 p.s.i. Fiber diameters measured over several thousand feet of continuous filament were consistent to within ±3 percent. Rotating beam cyclic tests on 3.2±0.5-mil fibers have demonstrated the excellent fatigue behavior of the boron fibers for outer fiber bending stress values between 225,000 and 600,000 p.s.i. calculated assuming a modulus of $65 \times 10^6$ p.s.i.

What is claimed is:

1. In the processes for producing continuous boron filaments by the chemical deposition on a resistively heated wire from a reactant gas mixture including a boron-containing gas as the wire is drawn through a reactor, the improvement which comprises:

exposing the wire to a first reactant gas mixture in the reactor the first gas feed to and exhaust from the reactor being oriented to provide concurrent flow with respect to the direction of movement of the wire;

exposing the wire in the reactor to a second reactant gas mixture having a greater concentration of boron-containing gas then the first gas mixture the second gas feed to and exhaust from the reactor being oriented to provide countercurrent flow with respect to the direction of movement of the wire;

and adjusting the concentration of the boron-containing gas in each of said mixtures to provide a wire temperature peak in both the concurrent and countercurrent flow regions of the reactor.

2. The improvement according to claim 1 in which: the gas mixtures each comprise a boron halide and hydrogen.

3. In the processes for producing continuous boron filaments by chemical deposition on a resistively heated wire from a reactant gas mixture including boron trichloride and hydrogen as the wire is drawn through a reactor, the improvement which comprises:

admitting a first boron trichloride-hydrogen gas mixture to the reactor adjacent the wire inlet and discharging said first mixture downstream of said inlet;

admitting a second boron trichloride-hydrogen gas mixture to the reactor adjacent the wire exit and discharging said second mixture upstream of said exit, said second gas mixture having a greater concentration of boron trichloride than the first gas mixture;

and adjusting the boron trichloride concentration in said second mixture to provide a temperature peak in the countercurrent flow region of the reactor, the temperature peak approximating that of the wire in the concurrent flow region of the reactor.

4. The improvement according to claim 3 in which: the peak temperature of the wire is held below that at which spurious boron growths are formed.

5. The improvement according to claim 3 in which: the peak temperature of the wire does not exceed approximately 1300° C.

6. In the processes for producing continuous boron filaments by the chemical deposition on a resistively heated wire from a reactant gas mixture comprising boron trichloride and hydrogen as the wire is drawn through a reactor, the improvement which comprises:

exposing the wire to a first reactant gas mixture admitted to the reactor adjacent the wire inlet wherein the volume ratio of boron trichloride to hydrogen is 0.25–0.5, the first gas feed to and exhaust from the reactor being oriented to provide concurrent flow with respect to the direction of movement of the wire;

exposing the wire to a second reactant gas mixture in the reactor wherein the volume ratio of boron trichloride to hydrogen is 0.5–3, the second gas feed to and exhaust from the reactor being oriented to provide countercurrent flow with respect to the direction of movement of the wire; and adjusting the concentration of the boron trichloride in each of said mixtures to provide a wire temperature peak in both the concurrent and countercurrent flow regions of the reactor.

7. In the processes for producing continuous boron filaments by chemical deposition on a resistively heated wire from a reactant gas mixture including boron trichloride and hydrogen as the wire is drawn through a reactor, the improvement which comprises:

admitting a first gas mixture, having a volume ratio of boron trichloride to hydrogen of 0.25–0.5, to the reactor adjacent the wire inlet and discharging said first mixture downstream of said inlet;

admitting a second gas mixture, having a volume ratio of boron trichloride to hydrogen of 0.5–3, to the reactor adjacent the wire exit and discharging said second mixture upstream of said exit; and adjusting the boron trichloride concentration in said second gas mixture to provide a temperature peak in the countercurrent flow region of the reactor, the temperature peak approximating that of the wire in the concurrent flow region of the reactor but not exceeding approximately 1300° C.

8. The improvement according to claim 7 in which: the respective gas mixtures are admitted to the reactor at a pressure of approximately 1 atmosphere:

and the wire has at least the surface portion thereof formed from one or more of the metals selected from the group consisting of tungsten, tantalum and molybdenum.

References Cited

UNITED STATES PATENTS

| | | | |
|---|---|---|---|
| 2,853,970 | 9/1958 | Novak | 117—107.1X |
| 2,930,347 | 3/1960 | Bulloff | 117—107.1X |
| 3,293,074 | 12/1966 | Nickl | 117—106(A)X |
| 3,365,330 | 1/1968 | Hough | 117—106X |
| 3,409,469 | 11/1968 | Kuntz | 117—106X |
| 3,410,715 | 11/1968 | Hough | 117—106X |
| 3,424,603 | 1/1969 | Schwartz | 148—6.3X |

ALFRED L. LEAVITT, Primary Examiner

J. R. BATTEN, Jr., Assistant Examiner

U.S. Cl. X.R.

117—128; 148—6.3; 244—1